Nov. 7, 1967  G. W. GRAY  3,351,938
VEHICLE IDENTIFICATION APPARATUS
Filed May 17, 1965
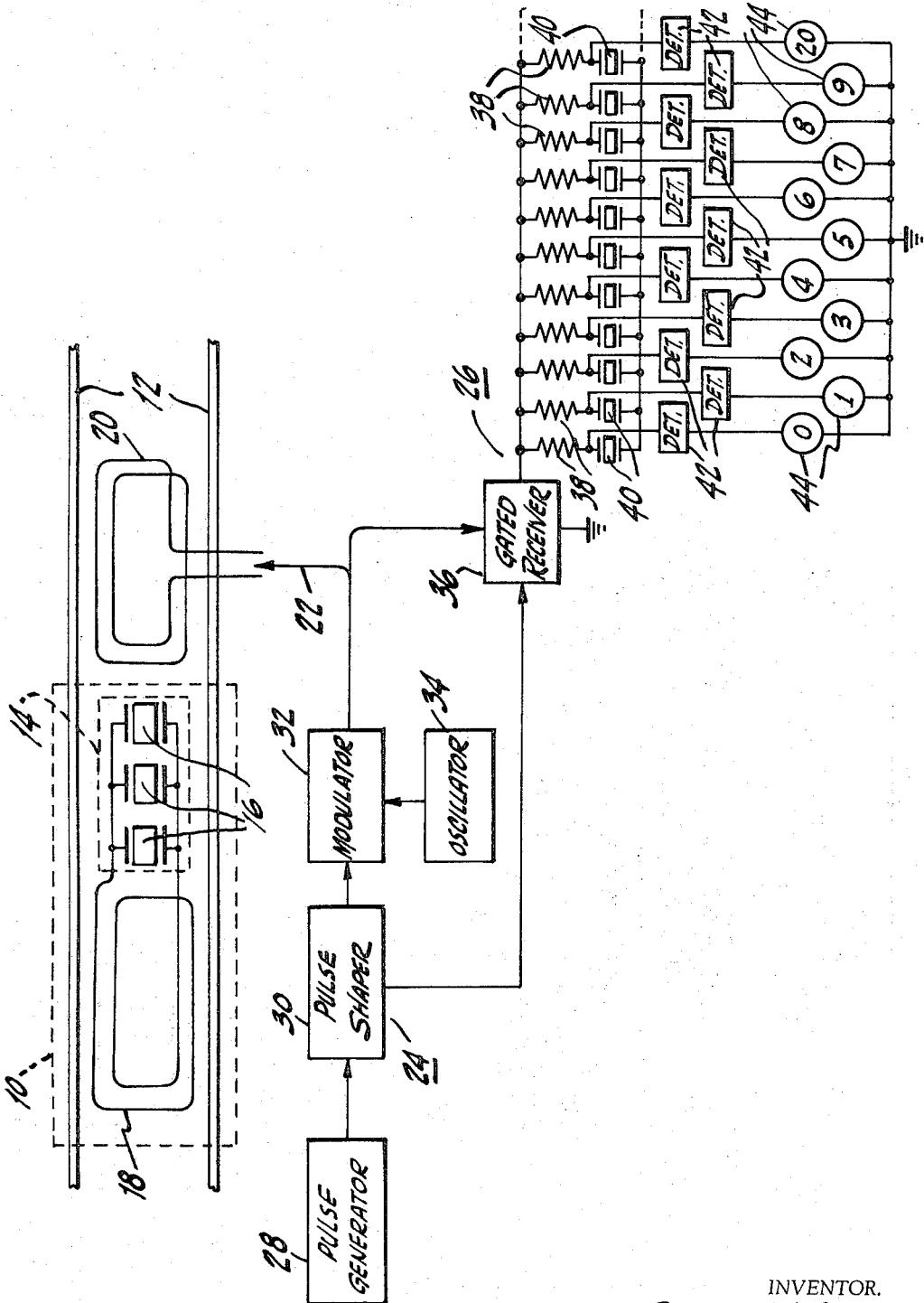
INVENTOR.
GEORGE W. GRAY
BY
Edward J. Norton
Attorney

3,351,938
VEHICLE IDENTIFICATION APPARATUS
George W. Gray, Lambertville, N.J., assignor to Radio Corporation of America, a corporation of Delaware
Filed May 17, 1965, Ser. No. 456,264
5 Claims. (Cl. 343—6.5)

This invention relates to electronic means for identifying vehicles passing a given point and particularly to an arrangement for identifying railroad cars as they move along a railroad track.

It is advantageous for a railroad dispatcher to know where the railroad cars are at any particular time for many reasons including checking on the positions and routes of the cars, finding lost or strayed cars and planning the most expeditious routing therefore. Since centralized computers having memories are available to the railroad companies, normally only the identification of the cars is necessary since other facts about the cars such as its lading and destination may be stored in the computer memory.

Car detection and identification apparatus should be economical in first cost, in installation and maintenance. The portion of the apparatus that is carried by the car, if any, should require no power source that may need replacing, should not require adjustment or maintenance, and should take up as little space as possible. No structural part of the identification apparatus should project from the car or from the railroad yard or from the tracks, since such projections provide hazards for other cars and for personnel operating the cars. The car detecting and identification apparatus should be operative in all kinds of weather, with all degrees of illumination, and should not be rendered inoperative by soot or other dirt that may have settled on the surface of the car. The identification apparatus should be capable of identifying the great number of cars in use in this country, and it should also be capable of identifying the owner or operator of the cars.

It is an object of this invention to provide an improved apparatus for detecting and identifying vehicles positioned at or passing a predetermined location.

It is a further object to provide an improved car identification apparatus requiring a minimum of space on the car to be identified.

Another object is to provide an improved railroad car identifying apparatus requiring no projecting parts either from the car or from tracks or at or near the tracks or roadbed and capable of identifying a car in all conditions of weather, of illumination and in all conditions of cleanliness of the car.

Still another object is to provide an improved vehicle identification apparatus capable of identifying any one of a great number of vehicles as well as any one of a great number of vehicle owners and users.

In accordance with this invention, a transponder apparatus is carried by each vehicle to be identified, this transponder including a number of resonant devices such as piezo-electric crystals each tuned to a different frequency. The vehicle also carries an antenna which is coupled to all the crystals. Further antennas are located at various places along the right of way or along the tracks where desired, and a separate transmitter-receiver is individually coupled to each of the further antennas. The transmitter portion of the transmitter-receiver comprises means for providing a short pulse of waves of a frequency close enough to the frequency of the crystals carried by the vehicle and of sufficiently high power to energize them via the above-mentioned antennas at their individual resonant frequencies. Or, if desired, the transmitter may provide a short, unmodulated high power pulse of a frequency not necessarily related to those of the crystals for energizing the crystals on the vehicles. The receiver portion of the transmitter-receiver includes a large number of crystals or other resonant devices, each tuned to a different frequency. A separate resonant device at the receiver is tuned to or near each of the frequencies of the crystals or resonant devices carried by all of the vehicles to be identified.

Upon applying a pulse from a transmitter to an antenna located along the railroad tracks, all the crystals on a nearby or passing vehicle are caused to oscillate. At the cesstion of the transmitted pulse, the crystals on the vehicle oscillate at their resonant frequencies long enough so that the waves produced thereby are applied to the antenna on the vehicle, to the further antenna located along the railroad tracks and from the further antenna to the receiver connected to the further antenna. The crystals at the receiver which are tuned to or near the resonant frequencies of the crystals on the vehicle to be detected and identified are made to oscillate at their own individual frequencies. Upon noting which of the crystals at the receiver are oscillating, the transponder and therefore the vehicle carrying it is identified. Since the frequency of each resonant device can correspond to a digit in any suitable numbering system such as a system using a base other than or greater than 10, only a minimum number of resonant devices need be carried by the vehicle that is to be identified.

The novel features of this invention, both as to its organization and method of operation, as well as additional objects and advantages thereof, will be understood more readily from the following description when read in conjunction with the accompanying drawing, in which the sole figure is a diagrammatic showing of one embodiment of apparatus constructed according to this invention.

While the disclosed detection and identification apparatus is shown in the sole figure as applied to railroad cars running along a pair of rails, the apparatus may obviously be applied to identify automobiles or trucks or other vehicles running along roads or other types of tracks. Referring to the figure, a car 10 shown in outline only, runs along a pair of rails 12. The car 10 carries a small container 14 which includes a plurality of resonant devices, here shown as piezo-electric crystals 16, connected in parallel. While only three crystals 16 are shown in the figure, more or less crystals can be carried by each vehicle to be detected and identified depending on the number of vehicles involved and the amount of information to be supplied. As few as six crystals may be sufficient as will be explained below, to identify the million or so railroad cars now in use in this country as well as to identify the 600 or so U.S. railway companies. The crystals 16 carried by each car 10 are all connected in parallel to a loop antenna 18 which is carried by the car 10 below the body thereof and above the lowest portion of the car axles, whereby the loop is protected from any obstructions that may be present on the tracks. No power supply is contained in, or is necessary for, the transponder carried by the car 10, and no structure or device requiring adjustment or replacement or maintenance comprises a part of the transponder. The crystals 16, included in their container 14, may be quite small and require very little space. The crystals, the container and the loop 18 are all the equipment carried by the car as comprising a part of the here described detecting and identifying apparatus.

A stationary loop, whose size is not critical, is positioned at any one or more locations where the cars are to be detected or identified. Each loop 20 is positioned between the tracks at or below the level of the ties. While a separate loop 20 has been shown in the drawing, the loop may include the rails 12 or portions thereof. The loop 20 by its construction and positioning does not project above the top of the rails or laterally thereof, whereby the loop does not provide a projecting structure and presents no hazards to passing cars or attachments thereto, to other vehicles operating in the vicinity of the tracks 12 or to any personnel that may be present. The stationary loop 20 is connected by lead lines 22 to a conveniently positioned transmitter 24 and receiver 26.

The transmitter 24 is shown as including a pulse generator 28 which produces pulses at the rate, for example of about 20 pulses per second. These pulses, provided by the pulse generator 28, are applied to a pulse shaper 30 which forms them into square pulses of about fifteen milliseconds duration at the rate of about twenty pulses per second. The formed pulses are applied to one input of a modulator 32 to the other input of which high frequency oscillations of a frequency of about two megacycles per second produced by an oscillator 34 are applied. The output of the modulator 32 is applied to the loop 20 and also to a gated receiver 36 comprising part of the receiving apparatus 26. Square pulses are also applied to the gated receiver 36 from the pulse shaper 30 to gate the receiver 36 off during the production of modulating pulses by the modulator 32, whereby none of the pulses produced by the modulator 32 and applied directly to the receiver 36 pass through it.

The output of the receiver comprises generally a means for determining the frequencies of the waves received by it from the antenna 20 between the pulses applied to the receiver by the pulse shaper 30, as will be explained below. The frequency determining means comprises a plurality of current limiting resistors 38 and resonant devices such as piezo-electric crystals 40 series-connected between an output lead of the gated receiver 36 and ground. A detector 42 and an indicator 44 are connected to each junction of a resistor 38 and a crystal 40.

Each of the crystals 16 and 40 may advantageously be quartz crystals cut to have little or no variation of frequency with changes in temperature, whereby weather conditions have no effect on the operation of the described vehicle detector and identifier. The resonant frequencies of the crystals 40 are all different, and may differ from each other by about $1/10$ of 1% and may all be higher in frequency than the frequency of the oscillator 34. While only eleven crystals have been shown, in a practical case, there may be many more of them. The crystals 16 on each car 10 may be six in number, the frequencies of each of the crystals 16 being identical with the frequency of respective ones of the crystals 40 or sufficiently close thereto so that oscillation of a crystal 16 will cause oscillation of a crystal 40. However, the combination of resonant frequencies of each car 10 is different than for any other car 10. Since, as will be explained, in identifying car 10, all six crystals 16 on the car 10 must produce an indication at the receiver 26, if less than six indications are produced at the receiver, it will be evident that the identification system is operating improperly whereby, to a certain extent, the described system fails safely.

The operation of the car detecting and identification apparatus is as follows: the transmitter 24 continuously produces pulses of a radio frequency or it may be turned on upon the approach of a car. This turn-on control can be operated by suitable means, not shown, responsive to the passing of a car over a given section of track or by suitable means, not shown, under the control of a dispatcher or other personnel. The produced pulses are applied to the stationary loop antenna 20 and at the same time a pulse is applied to the gated receiver 36 by the pulse shaper 30 to block the receiver 36 during the duration of the transmitted radio frequency pulses. Therefore, in the absence of a car to be identified, the receiver gives no indication. When a car 10 passes within the field of the antenna 20, the loop 18 on the car 10 picks up the transmitted wave and applies it to all the crystals on the car 10. The carrier frequency of the pulses applied to the crystals is within a range that will cause all the crystals 16 to oscillate and these crystals 16 will continue to oscillate for a short period of time and at their own individual frequencies after a pulse from the transmitter 24 has ceased. Oscillations at these individual frequencies are applied to the loop 18, received by the loop 20 and applied to the receiver 36. The crystals 16 continue to oscillate for a short period of time at their individual frequencies after each energizing pulse from the modulator 32 and the coincident blocking pulse from the pulse shaper 30 have both ceased. The receiver 36 is then in condition to receive the waves applied thereto from the antenna 20. The receiver 36 amplifies these waves and passes them on to all the crystals 40 through their individual current limiting resistors 38. If a particular crystal 40 is not resonant to any of the frequencies applied thereto, that crystal 40 will act as a conductor. The voltage which appears at the junction of the crystal 40 and its respective resistor 38, and which is applied to a respective detector 42, will be such as not to energize that detector 42 or to cause its respective indicator 44 to provide an indication. However, each of the several crystals 40 which are resonant at or near to one of the received frequencies applied thereto, act as a nonconductor or parallel resonant circuit for waves of its resonant frequency, or frequency near thereto, and the voltage at the junction of the energized crystals 40 and their respective resistors 38 is higher than the voltage at the corresponding connection points to the unenergized crystals 40. Therefore, each of the detectors 42 and indicators 44 connected to the crystals 40 which are responsive to the waves received from the crystals 16 are energized to give an indication of the frequencies of the crystals 16 carried by the car 10 and therefore of the identity of the car 10 and of the owner or operator thereof.

As noted above, only six crystals 16 need be provided for each car and yet about 1,000,000 railroad cars and about 600 railroad companies in the United States can be identified. In this connection, one or more crystals 16 located on the car can be assigned to owner or user identification. The remaining crystals 16 can be used for car identification. In addition, a desired number of crystals 16 can be assigned to convey any other information wanted about the car or contents.

There may be as many as ninety crystals at each of the receiver-transmitter stations, ten for each of the units, the 10's, 100's and the 1000's places (the first, second, third and fourth places respectively), twenty for the 10,000's place or fifth place and thirty for the 100,000's or sixth place. To identify one of the ten big railroads as the owner of a car, a crystal having a frequency of one of the first ten crystals of the sixth place is positioned on the car. The number of the car is then provided by allocating the other five crystals on the car to the five places of the number of the car. Since there are twenty different crystal frequencies for the fifth place, about 200,000 cars of a designated company may be identified in this manner, and if a larger number of identifications are necessary, an eleventh frequency at the sixth place (other than the ten reserved for big company identification) may be used to provide identification for many more cars.

While there are many more smaller companies than larger companies, the smaller companies each have less cars than the larger companies, so a frequency of the twelfth through the twentieth frequency of the sixth place and a frequency of the twelfth through the twentieth frequency of the fifth place may be used to identify companies having no more than 99,999 cars. The cars themselves may be identified by using the frequencies in the first four places and the first ten frequencies in the fifth place. If necessary, one or more of the twenty-first through the thirtieth frequencies of the sixth place may be used to identify companies (if there be more than 99 thereof) that have between 10,000 and 99,999 cars. Similarly, one of the twenty-second through thirtieth frequencies of the sixth place, one of the eleventh through twentieth frequencies of the sixth place and one of the eleventh through twentieth frequencies of the fifth place may be used to identify the larger number of railroads having a lesser number of cars, using whatever frequencies of the first, second, third and fourth places as may be necessary to identify a particular car, and using the frequencies in the sixth place not used to identify other companies as part of the identification of this group of smaller railroad companies. In all cases, six crystals are present on the car and all six crystals are energized, a different crystal being used to designate each zero, where necessary.

Another system of numerology using only six crystals on each vehicle, all of which however are energized in the identification of the vehicle and its owner, may be as follows: the six crystals are divided into three groups of two crystals each, the first two groups of four crystals producing about a million different combinations to identify about a million railroad cars and the last group of two crystals producing 625 different combinations to identify the 600 or more railroad companies. The first crystal of the first group of crystals is given one of fifty frequencies, each individual frequency representing the numbers 0–49 inclusive. The second crystal of the first group is given one of twenty additional frequencies, ten of these frequencies representing zero hundreds to nine hundreds in steps of 100 and ten of these additional frequencies representing 50 to 950 in steps of 100. The first crystal of the second group thereof is given one of fifty further frequencies each representing zero thousands to 49,000 in steps of 1000, and the second crystal of the second group is given one of twenty still further frequencies, ten thereof representing zero hundred thousands to 900,000 in steps of 100,000 and ten others of these twenty frequencies representing 50,000 to 950,000 in steps of 100,000. Therefore, these four crystals can indicate any number from 000,000 to 999,999. Each of the two crystals of the third group thereof has one of the twenty-five still other frequencies, these last fifty frequencies all being different from each other. The third group of crystals can therefore identify any one of the 600 or so U.S. railroad companies. With this system of numerology, the number of crystals, all tuned to different resonant frequencies, at the receiver will be 190.

While the system of numerology described above can be used to identify about 600 railroads and about 1,000,000 cars, using only six crystals on each car, other systems of numerology may suggest themselves. Obviously the number of crystals may be reduced at the receiver by not providing crystals for unused frequencies.

Although only a single car detecting and identifying apparatus has been particularly described, variations thereof are possible within the spirit of the present invention. For example, instead of blocking off the receiver when the transmitter is providing pulses, as described above, any of the known devices for disconnecting the receiver from the antenna or for disabling the receiver while the transmitter is providing pulses, or both, may be used. Similarly, a heterodyne type of receiver may be used whereby the receiver crystals may differ in frequency from the vehicle carried crystals by the frequency of the locally produced wave. Also, the indications provided by the crystals 40 may be read by observing the indications 44, or the indications may be fed to a computer, or both. It should therefore be understood that the foregoing description is to be considered as illustrative and not in a limiting sense.

What is claimed is:

1. A movable object detecting and identifying apparatus comprising in combination a transponder to be mounted on the movable object to be detected consisting of a plurality of differently tuned resonant devices and a first antenna connected in energy transfer relation to said devices, a second antenna positioned along the path of travel of said object, a transmitter coupled to said second antenna, said transmitter transmitting unmodulated pulses of a radio frequency wave to cause energization simultaneously of all of said differently tuned resonant devices comprising part of said transponder upon energy transfer from said second antenna to said first antenna, a receiver also coupled to said second antenna, said receiver including resonant devices tuned to the frequencies of said transponder devices whereby upon reception of waves from said transponder by said receiver said receiver devices which are tuned to the frequency of said energized transponder devices become energized, means to prevent operation of said receiver during transmission of a pulse by said transmitter, and means to indicate which receiver tuned resonant devices are energized thereby to identify said object.

2. A movable object identification apparatus for identifying a plurality of movable objects comprising a respective transponder to be mounted on each of said objects, said objects being adapted to move along a path, each of said transponders consisting of the same number of crystals tuned to various frequencies, the tunings of the crystals of each transponder being individual to that transponder, an antenna mounted on said object, said antenna being connected in energy transfer connection to said crystals, and a transmitter receiver device, said device comprising an antenna located along said path, means for producing periodic pulses connected to said last named antenna to energize all of the crystals of a transponder in the vicinity of said last-named antenna simultaneously, a receiver having an input terminal connected to said pulse producing means and having an output terminal, means for preventing said receiver from receiving said pulses from said pulse producing means, a plurality of crystals connected to the output terminals of said receiver, whereby upon applying pulses to said last-named antenna, all of said crystals of the transponder in the vicinity of said last-named antenna are energized and upon the cessation of said pulses, corresponding crystals connected to said receiver are energized, and means for indicating the energization of individual ones of said plurality of crystals which are connected to said receiver.

3. A railroad car identification apparatus comprising a transponder to be mounted on a railroad car adapted to run on railroad tracks, said transponder consisting of a plurality of crystals tuned to different frequencies, an antenna mounted on said car, said antenna being connected in energy transfer connection to said crystals, ad a transmitter-receiver device, said device comprising an antenna located along said track, means for producing periodic pulses of an unmodulated wave of a frequency to energize all of said transponder crystals connected to said first named antenna upon energy transfer from said last named antenna to said first named antenna, a receiver having an input terminal connected to said pulse producing means and having an output terminal, means for preventing said receiver from receiving said pulses during the production thereof, a plurality of crystals connected to the output terminals of said receiver, whereby upon applying pulses to said second mentioned antenna, said crystals of said car are energized and upon the cessation of said pulses, corresponding crystals connected to said receiver are energized, and means for indicating the energization of individual ones of said plurality of crystals which are connected to said receiver.

4. A vehicle detecting and identifying apparatus comprising in combination a transponder to be mounted on a vehicle to be detected consisting of
- a plurality of differently tuned crystals and a first antenna connected in energy transfer relation to said crystals, a second antenna positioned along the path of travel of said vehicle, a transmitter coupled to said second antenna said transmitter transmitting unmodulated pulses of a radio frequency wave at a frequency sufficiently close to the frequency of said transponder crystals to cause energization of all of said transponder crystals upon energy transfer from said second antenna to said first antenna, a receiver also coupled to said second antenna, said receiver including crystals tuned to the frequencies of said transponder crystals whereby upon reception of waves from said transponder by said receiver said receiver crystals which are tuned to the frequency of said energized transponder crystals become energized, means to block said receiver during transmission of a pulse by said transmitter, and means to indicate which receiver crystals are energized thereby to identify said vehicle.

5. A transmitter-receiver device for a vehicle identification apparatus comprising an antenna located along a path for said vehicle, transmitter means connected to said antenna, for producing pulses of an unmodulated wave to energize a plurality of resonant devices to be carried by said vehicle, a receiver having an input terminal connected to said transmitter means and having an output terminal, means for preventing said receiver from receiving said pulses during the production thereof, a plurality of resonant devices connected to the output terminals of said receiver, whereby upon applying pulses to said antenna, said devices of said vehicle are energized and upon the cessation of said pulses, corresponding devices connected to said receiver are energized, and means for indicating the energization of individual ones of said plurality of devices which are connected to said receiver.

References Cited
UNITED STATES PATENTS

| | | | |
|---|---|---|---|
| 3,054,100 | 9/1962 | Jones | 343—6.5 |
| 3,169,242 | 2/1965 | Davis et al. | 343—6.5 |
| 3,209,351 | 9/1965 | Davis | 343—6.5 |

RODNEY D. BENNETT, *Primary Examiner.*

CHESTER L. JUSTUS, *Examiner.*

D. C. KAUFMAN, *Assistant Examiner.*